United States Patent [19]
de la Croi Habimana et al.

[11] Patent Number: 5,659,001
[45] Date of Patent: Aug. 19, 1997

[54] MOISTURE CURABLE COMPOSITIONS

[75] Inventors: Jean de la Croi Habimana, Wales, United Kingdom; Patrick Leempoel, Brussels, Belgium

[73] Assignee: Dow Corning S. A., Seneffe, Belgium

[21] Appl. No.: 565,475

[22] Filed: Nov. 30, 1995

[30] Foreign Application Priority Data

Dec. 1, 1994 [GB] United Kingdom ............ 9424246

[51] Int. Cl.$^6$ .................................................. C08G 77/08
[52] U.S. Cl. .................. 528/17; 528/18; 528/26; 528/38
[58] Field of Search ............................. 528/26, 38, 17, 528/18

[56] References Cited

U.S. PATENT DOCUMENTS

| | | | |
|---|---|---|---|
| 4,631,322 | 12/1986 | Isayama et al. | 525/480 |
| 4,786,667 | 11/1988 | Shimizu et al. | 523/435 |
| 4,847,357 | 7/1989 | Shimizu et al. | 528/374 |
| 4,873,272 | 10/1989 | Shimizu et al. | 523/212 |
| 4,933,415 | 6/1990 | Shimizu et al. | 528/27 |
| 4,950,707 | 8/1990 | Shimizu et al. | 524/609 |

FOREIGN PATENT DOCUMENTS 1058358  2/1967  United Kingdom.
1337579 11/1973 United Kingdom.

OTHER PUBLICATIONS

Great Britian Search Report, dated 10 Mar. 1995.

*Primary Examiner*—Melvyn I. Marquis
*Attorney, Agent, or Firm*—Roger H. Borrousch

[57] ABSTRACT

A moisture curable composition is claimed comprising (a) a condensation product of a polyacid chloride with an alkylene or oxyalkylene polymer having substituent groups condensible therewith with an organosilicon compound having at least one silicon-bonded group —R(NHR$^1$)$_m$NH$_2$ e.g. a material of the general formula

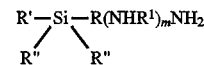

wherein each R may be the same or different and represent a linking group, each R' represents a group —R(NHR$^1$)$_m$NH$_2$, a hydrolysable group R", a group R'" or a group R'Si(OSiR$^1{}_2$)$_s$—O— where R'" is a hydrocarbon group, m is from 0 to 10 and s is from 0 to 1500 and (b) a curative. Preferred materials are amino silanes in which R" is an oximo, alkoxy, alkenyloxy or alkoxyalkoxy group, —R(NHR$^1$)$_m$NH$_2$ is aminopropyl and m is 0. The aminosilane is preferably γ-aminopropyltrimethoxysilane or γ-aminopropyltriethoxysilane and the organic polymer is a polyoxyalkylene glycol.

11 Claims, No Drawings

MOISTURE CURABLE COMPOSITIONS

This invention is concerned with moisture curable compositions and is particularly concerned with silicone based curable compositions useful as sealant compositions which employ a silyl modified organic polymer.

Silicone based curable compositions have for many years been employed as sealant compositions for a variety of applications, for example in the construction industry for the sealing of vertical or horizontal joints in walls and masonry structures and in the manufacture and installation of glazing units. In general these sealant compositions demonstrate good resistance to degradation by the weather and are not readily wetted by water.

It has been proposed to employ compositions containing silyl modified organic polymers rather than polydiorganosiloxanes. Polymers proposed for such use include high molecular weight polyoxyalkylene polymers end-blocked with a hydrolysable silyl group.

Materials of this general type have been mentioned in several patent specifications of which the earliest known to the applicant is G.B. 1 058 385. G.B. 1 058 385 specifies various organic groups which may provide the hydrolysable group, namely hydrocarbonoxy, halohydrocarbonoxy, acyloxy, halogenated acyloxy, primary, secondary or tertiary amino groups in which the substituents are hydrocarbon or halo-hydrocarbon radicals or a diorgano-substituted isocyanoxy group of the general formula $R_xR_yC=N-O-$ in which $R_x$ and $R_y$ are the same or different and are each a hydrocarbon or halohydrocarbon group. Numerous subsequent proposals for materials and methods of making them have been described in the art. These proposals include methods of preparing organic polymers by introducing hydrolysable silyl groups into the molecular chain which include, for example, these in which (1) a monomer having an epoxy group and a silicon containing hydrolysable group e.g. γ-glycidoxypropylmethyl-dimethoxysilane or γ-glycidoxypropyltrimethoxysilane is copolymerised with an alkylene oxide e.g. propylene oxide or ethylene oxide to produce a polyether having a hydrolysable silicon containing group in the side chains; (2) a polyoxy-alkylene glycol such as polyoxypropylene polyol or polytetra-methylene diol is reacted with a compound having a functional group e.g. an isocyanato group, capable of reacting with a hydroxyl group of the polyoxyalkylene polyol and having a silicon containing hydrolysable group, thereby introducing a hydrolysable silicon containing group into the polymer chain end and (3) a polyisocyanate compound is reacted with a hydroxyl group of a polyoxyalkylene polyol as in (2) to produce a compound having an isocyanato group and the produced compound reacted with a compound having both a silicon containing hydrolysable group and a group capable of reacting with the isocyanato group such as a carboxyl, hydroxyl, mercapto or amino group, thereby introducing a hydrolysable silicon containing group into the polymer chain end.

Prior art methods of preparing modified polyethers of which applicant is aware generally employ energy intensive processes or a plethora of raw materials or operating steps in order to produce polymer with at least one silicon-containing group. See, for example, E.P. 159 605, U.S. Pat. No. 4,873,272, U.S. Pat. No. 4,847,357 and U.S. Pat. No. 4,786,667.

Those prior art processes which rely on a hydrosilylation reaction require use of a noble metal catalyst e.g. a platinum derivative. The platinum catalysts employed are comparatively expensive, so that the processes are comparatively costly.

It is an object of the present invention to provide a curable composition containing an improved silyl modified organic polymer.

We have now found that improved silicone based room temperature curable compositions which cure through the action of atmospheric moisture may comprise a polyether based organic polymer which has been modified to incorporate at least one silyl group attached to the polyether polymer by an amido linkage.

The present invention provides in one of its aspects a moisture curable composition comprising the reaction product of (A) a condensation product of a polyacid chloride with an organic polymer having chain units selected from the group consisting of alkylene and oxyalkylene units in its molecular chain and substituent condensible groups with (B) an organo-silicon compound having at least one hydrolysable group and at least one silicon-bonded group $-R(NHR^1)_mNH_2$ wherein each R may be the same or different and represents a linking group, $R^1$ represents a monovalent hydrocarbon group and m has a value from 0 to 10.

A composition according to the invention requires the reaction product of (A) a condensation product of a polyacid chloride with an organic polymer having alkylene or oxyalkylene chain units and groups condensible with the polyacid chloride, with (B) an organosilicon compound having at least one silicon-bonded group $-R(NHR^1)_mNH_2$. The condensation product (A) has acyl chloride groups for reaction with the amino group. The reaction between (A) and (B) is preferably carried out in the liquid phase either with the materials in solution or more preferably using a polymer (A) which is liquid at the temperature of reaction and (B) a silane. Thus we prefer to employ polymers having a molecular weight of less than 200,000 and more preferably from about 500 to about 100,000. Suitable condensation products (A) may be formed by condensing a poly-acid chloride with an organic polymer having alkylene or oxyalkylene units in its molecular chain and having substituent condensible groups, for example hydroxyl, mercapto or amino. Organic polymers having suitable substituent groups are available in commerce and include those containing polyoxyethylene, oxypropylene, and/or oxybutylene units or butadiene or isobutylene units. These materials may be linear or branched and may have one, two, three or more condensible substituents per molecule. We prefer to employ linear α,ω-dihydroxyl materials.

Poly-acid chlorides which may be used to form the required condensation product (a) have two or more acid chloride groups, for example oxalyl, malonyl, glutaryl, adipoyl, phthalyl, terephthalyl, or isophthalyl chlorides. We prefer to employ an α,ω-diacid chloride of a saturated aliphatic dicarboxylic acid of the formula

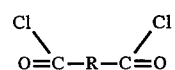

in which R represents $-(CH_2)_n-$ where n has a value from 2 to 10, more preferably from 3 to 5 as exemplified by glutaryl dichloride and adipoyl dichloride (n=3 or n=4). These poly-acid chlorides may and preferably do serve to link polymer chains of the organic polymer as well as to provide condensible groups

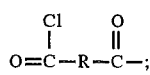

the chain extension reaction, forming an ester linkage between e.g. oxyalkylene chains, is favoured when the ratio of chlorine of the acid chloride to substituent groups of the organic polymer condensible therewith is close to 1 whereas the reaction to produce the groups

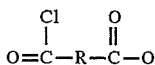

attached to the polymer is favoured when the ratio of chlorine to substituent groups of the polymer condensible therewith is greater than 1. Thus a composition according to the invention may and preferably does employ a condensation product (A) formed by not only end-capping but also chain extending a comparatively short chain polymer to the desired extent by reacting the poly-acid chloride and polymer having substituent groups condensible therewith in proportions such that the ratio of chlorine of the acid chloride to substituent groups of the organic polymer condensible therewith permits a desired proportion of chain extension. We prefer to use the commonly available hydroxyl terminated polyoxy-propylenes and polyoxyethylene-oxypropylenes having chain units —(CH$_2$—CH$_2$—O)$_p$— and

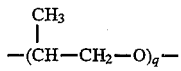

where p has a value of 0 to about 100 and q has a value of 1 to about 300 and having a molecular weight in the range of about 57 to 4000 (preferably 2000 to 4000) to provide a basis for the desired organic polymer of appropriate molecular weight and to react these with the preferred poly-acid chloride in proportions such that the ratio of chlorine of the acid chloride to hydroxyl groups of the organic polymer is up to 1.25. We prefer to eliminate the condensation product e.g. HCl formed during this reaction for example by simple separation or by addition of a base e.g. an amine.

The organosilicon compound (B) used to prepare the reaction product used in the invention preferably has at least two hydrolysable groups bonded to silicon and is preferably of the general formula

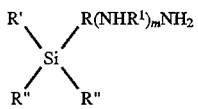

wherein R represents a linking group, R" represents a hydrolysable group, R' represents a group —R(NHR$^1$)$_m$NH$_2$,

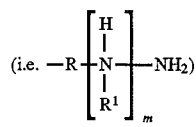

a group R", a group R'" (which is a monovalent hydrocarbon group) or a group R'Si(OSiR$^1{}_2$)$_s$—O— and m has a value of from 0 to 10. The hydrolysable group or groups R" may be selected from, for example, the group consisting of oximo, alkoxy (including alkoxyalkoxy) and alkenyloxy groups. The monovalent hydrocarbon groups R$^1$ may be selected from, for example, the group consisting of alkyl, (e.g. methyl, ethyl or propyl), alkenyl (e.g. vinyl, allyl or hexenyl, aryl (e.g. phenyl) and alkaryl (e.g. cyclohexenyl) groups. We prefer to use an aminosilane having one group —R(NHR$^1$)$_m$ NH$_2$ wherein the linking group is a group —(CH$_2$)$_n$— where n has a value from 2 to 10, more preferably from 3 to 5 as exemplified by propyl. The amino silanes in which m is 0 are generally preferred in order to avoid proliferation of side reactions between secondary amino groups and other groups present during the reaction. The aminosilanes in which R' represents an alkyl group or a hydrolysable group are preferred.

Typical examples of silanes suitable for use as the organosilicon compound (B) are aminopropyltrimethoxysilane, aminopropyltriethoxysilane, aminopropylmethyldiethoxysilane, aminomethyltrimethoxysilane and aminomethyltrimethoxysilane.

Reaction products (A) used in a composition according to the invention may be made according to the scheme

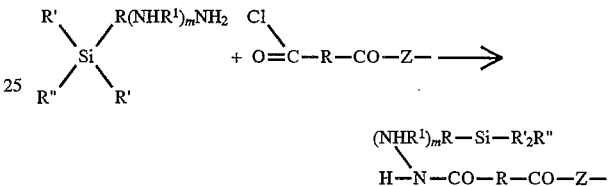

and have their silyl groups bonded to the organic polymer chain through amide linkages which are somewhat resistant to hydrolysis. The condensation reaction may be brought about within a period of from 1 minute to 5 hours by heating the reaction mixture to a temperature in the range 25° C. to 150° C. Preferred materials are of the general formula

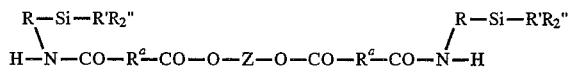

wherein Z is —([(Eo)$_p$(Po))$_q$]—CO—OR$^a$—O—CO—[(Eo)$_p$(Po)$_q$])$_r$— where R$^a$ represents —(CH$_2$)$_n$—, Eo represents —CH$_2$—CH$_2$—O—, Po represents

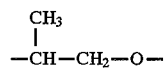

and R, R', R" n, p and q are as aforesaid and r represents an integer such that the molecular weight of Z is up to about 4,000.

A composition according to the invention may comprise a material (C) which serves as a scavenger to eliminate excess moisture from the composition or which in presence of moisture is effective to cure the composition via a condensation reaction with the reaction product (A). Suitable materials (C) are those known for curing the corresponding alkoxy, acetoxy and oximo terminated polysiloxanes for example the orthosilicates and more particularly the hydrolysable silanes, for example a silane having two, three or four hydrolysable groups selected from the group consisting of acetoxy, oximo, alkoxy and alkenyloxy. Typical examples of suitable silanes are the di-, tri- and tetra-oximo silanes, the di-, tri- and tetra-alkoxy silanes, the alkenyloxy silanes and the mixed oximoalkoxysilanes. Examples of these silanes are methyltrioximosilane, vinyltrioximosilane, tetraoximosilane, ethyltriethoxysilane, methyltrimethoxysilane, vinyltrialkoxysilane, methyldioximoalkoxysilane, vinyldioximoalkoxysilane, trioximoalkoxysilane, oximotrialkoxysilane and diaminodioximosilane.

A composition according to the invention may also and preferably does comprise a condensation catalyst (D) for promoting condensation reaction of the reaction product of polymer (A) and material (B) in presence of atmospheric moisture and material (C) when present, for example an organotin salt, or titanium complex. Examples of suitable titanium complexes include titanium diisopropoxy diethyl aceto-acetate, titanium diisopropoxy diacetyl acetonate and titanium tetra alkoxides where the alkoxide is butoxy or propoxy. The titanium complex may be employed in a proportion of approximately 0.2 part by weight per 100 parts by weight of the reaction product of (A) and (B). Examples of suitable tin compounds include dibutyltindilaurate and tin octoate. The tin compounds may be employed in a proportion of approximately 0.02 to 0.2 part by weight per 100 parts by weight of the reaction product.

A composition according to the invention may also comprise one or more polysiloxanes having silicon-bonded hydroxyl groups or groups R" as aforesaid, capable of taking part in the moisture cure condensation reaction. Other adjuvants may also be included; for example, there may be incorporated into the composition plasticisers, extenders, pigments such as titanium dioxide, carbon black and iron oxide, and processing and adhesion promoting additives. Plasticisers and extenders which may be employed include the organic phthalate esters and non-functional end-capped polyalkylene oxides as well as the trimethylsilyl end-capped polydimethylsiloxane fluids (PDMS). Adhesion promoting additives may be employed if required for improving the adhesion of the cured composition to glass, metal or other substrates for example, epoxy, amino and mercapto functional alkoxysilanes and certain reaction products and or mixtures thereof. Preparation of compositions according to the invention can be effected by known mixing techniques. They may be formulated into single package or multiple package configurations as required. They may be prepared by mixing the selected components in any desired order. For example, the reaction product of (A) and (B) may be mixed with the other components or the reactants (A) and (B) may be mixed with the other ingredients of the composition and the reaction product produced in situ.

Compositions according to the invention may be formulated without use of solvent which have good adhesion to various substrates (e.g. glass, anodised aluminium, polymethylmethacrylate and polyvinylchloride) without the presence of a specific adhesion promoter and which are capable of being painted.

In order that the invention may become more clear there now follows a description of examples of which Examples 4 to 9 are illustrative of the invention. All parts and percentages are expressed by weight unless otherwise indicated, all viscosities are measured at 25° C. The Tensile Strength, Elongation at Break and Modulus at 100% extension were measured according to ASTM D412 using cured strips or slabs of the compositions. The time in minutes which elapsed between application of the bead to the substrate and development of a non-tacky surface on the bead was noted as the SOT or TFT. SOT (skin overtime) was assessed by a finger test and TFT (tack free time) was determined by a peel test using a film pressed onto the bead. Tackiness of the cured sealant was determined by finger testing the cured composition and estimating its surface tack on the scale 0 to 4 with 0 being the most tacky and 4 the least tacky. For the assessment of the paintability, the following test was used. Sealant composition was extruded to a depth of 4 mm into a gutter formed from wood. The sealant composition was allowed to cure for one week at room temperature. The sealant was then painted. Spreading of the paint on the sealant surface was assessed by the observation of the formation of fish-eyes on the coating. Values were ascribed as follows:

Good: no fish eye formed while paint was drying.

Poor: at least one fish eye formed while paint was drying.

The paint was left to "dry" for one week on the sealant surface. Those cases where the paint failed to cure or set fully are recorded in the Tables as "U". The cured paint films were cut with a razor blade to prepare small squares. A piece of adhesive tape was then applied on the paint and removed quickly. The paint adhesion was determined by the number of paint squares left on the sealant after having removed the tape. The numbers of paint squares remaining on the sealant surface is recorded in the Tables.

EXAMPLE 1

Chain extension as a function of (Cl)/(OH) ratio 10 parts of polypropylene glycol (PPO) (MW=2000) were introduced into 100 ml bottles and glutaryl dichloride ((GD) added in amounts as shown in Table 1. The reaction mixtures were allowed to react for 2 hours at 12° C. at room pressure. Higher chain extension efficiency was obtained when the (Cl)/(OH) ratio was close to 1. Below a ratio of 1 the resulting polymer was hydroxy end-blocked, whilst above 1 an acid chloride end-blocked polymer was formed.

TABLE 1

| Number | PPO Parts | GD Parts | (Cl)/(OH) | Viscosities cSt |
| --- | --- | --- | --- | --- |
| 1 | 10 | 0.31 | 0.39 | 1250 |
| 2 | 10 | 0.40 | 0.50 | 2220 |
| 3 | 10 | 0.51 | 0.64 | 4760 |
| 4 | 10 | 0.60 | 0.76 | 9900 |
| 5 | 10 | 0.69 | 0.86 | 37860 |
| 6 | 10 | 0.79 | 0.99 | 369600 |
| 7 | 10 | 0.91 | 1.15 | 210180 |
| 8 | 10 | 1.00 | 1.26 | 35150 |
| 9 | 10 | 1.10 | 1.18 | 16300 |
| 10 | 10 | 1.20 | 1.50 | 9500 |

EXAMPLE 2

Non-stabilised dialkoxysilane end-capped polymer 100 parts polypropylene glycol (PPO) (MW=2000) were introduced in a 250 ml reaction flask and dried for 1 hour under vacuum at 120° C. 10 parts glutaryl dichloride was then injected and allowed to react for 4 hours at 120° C. under vacuum. Hydrogen chloride resulting from the reaction was trapped in a 0.984N KOH solution. Polymer samples were taken as a function of time and viscosities, MW (i.e. measured by GPC) and polydispersity (MWD) (i.e. molecular weight distribution) were measured and the results are shown in Table 2. After 4 hours 1 part gamma-aminopropyl methyldiethoxysilane was injected and allowed to react for 1 hour. The polymer obtained displayed a mono-modal molecular weight distribution indicating that the starting polyglycol had been consumed. The final polymer cured rapidly without any condensation catalyst when exposed to atmospheric moisture. The final polymer is believed to be α,ω bis methyldiethoxy silyl propyl N-amido glutarate polypropylene glycol/glutarate copolymer. The self-curing was probably catalysed by hydrogen chloride present in the reaction medium after the chain extension and the end-capping reactions.

TABLE 2

Viscosity, molecular weight and molecular weight distribution as a function of time.

| Time (minutes) | Viscosity (cSt) | MW | MWD |
|---|---|---|---|
| 0 | 367 | 2100 | 1.32 |
| 60 | 50600 | 28000 | 3.59 |
| 120 | 55800 | 28400 | 3.77 |
| 180 | 55800 | 28400 | 3.70 |
| 225 | 57800 | 28100 | 3.95 |
| 960 | 85000 | 31600 | 3.63 |

EXAMPLE 3

Evidence of amide functions

Equimolar amounts of acetyl chloride and aminopropyltriethoxysilane were introduced to a reaction flask and allowed to react at room temperature in ethylene glycol dimethyl ether used as solvent and trihexylamine used to trap hydrogen chloride resulting from the reaction. The product of the reaction was obtained after 10 seconds and was identified by gas chromatography/mass spectra (CG/NS) as

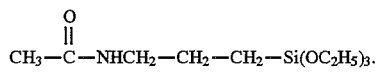

EXAMPLE 4

Trihexylamine stabilised trialkoxysilane end-capped polymer

Equimolar amounts of PPO and GD were introduced in duplicate reaction flasks and allowed to react for 2 hours under vacuum at 120° C. to a viscosity of about 13,000 cSt and then end-capped with aminopropylmethyldiethoxysilane/trihexylamine (APDS/THA) mixture. Stoichiometric excess of trihexylamine was used in the mixture. Both polymers were stable when exposed to atmospheric moisture and it is believed the THA served to neutralise HCl generated in the reaction. Moisture curable formulations were prepared containing these polymers, finely divided calcium carbonate, dioctylphthalate (DOP) as plasticiser, methyltrimethoxysilane (MTM) as curative and dibutyl tin dilaurate (DBTL) as catalyst for condensation reaction with atmospheric moisture. These formulations cured readily at room temperature. They were tested for tack free time (TFT), tensile at break, modulus at 100% extension and elongation at break. Results are shown in Table 3.

TABLE 3

Polymer Formulation

| Ingredient | Polymer Composition 1 | Polymer Composition 2 |
|---|---|---|
| PPO | 50 | 50 parts |
| GD | 5.6 | 5.6 parts |
| Viscosity (2 h) cSt | 13300 | 12400 |

TABLE 3-continued

| APDS * | 3.3 | 3.2 parts |
| THA * | 9.2 | 13.9 parts |

Sealant Formulation

| | Sealant Composition 1 | Sealant Composition 2 |
|---|---|---|
| Polymer 1 | 25 | — parts |
| Polymer 2 | — | 27.5 parts |
| DOP | 10 | 10 parts |
| CaCO3 (Precipitated) | 14 | 14 parts |
| TiO2 | 4 | 4 parts |
| MTM | 0.8 | 0.8 part |
| DBTDL | 0.2 | 0.2 part |

Physical Properties

| TFT (hours) | >15 | >15 |
| Tensile (MPa) | 0.77 | 0.55 |
| Mod (100%) | 0.27 | 0.21 |
| EB % | 280 | 224 |

* APDS and THA are adjusted as a function of remaining polymer after the viscosities samples are taken out.

EXAMPLE 5

Triethoxysilane end-capped RTV polymer

Using similar reaction conditions as used in Example 4, except that APDS was replaced by aminopropyltriethoxysilane, the THA was replaced by Tri-isooctylamine (TIOA) a moisture curable polymer was prepared and a sealant composition using materials in proportions as shown below.

Polymer Process

| PPO | 1800 parts |
|---|---|
| GD | 197.6 parts |
| Aminosilane | 205 parts |
| TIOA (Triisooctylamine) | 285.8 parts |
| Time/temperature | 3 h/120° C. |
| End-capping | 30 min/50° C. |
| End molecular weight | 14800 |
| End MWD | 3.8 |
| Predicted molecular weight | 16000 |

A Sealant composition was prepared from

| Polymer | 1000 parts |
|---|---|
| CaCO3 (Precipitated) | 1200 parts |
| Dioctylphthalate | 500 parts |
| Methyltrimethoxysilane | 40 parts |
| Tin octoate | 10 parts |

Physical properties were tested 7 days after application and room temperature cure of the composition to form test samples.

| EB % | 250 |
|---|---|
| Modulus 100% MPa | 0.29 |
| Tensile MPa | 0.55 |

When the catalyst level in this formulation was increased to 1.6% by adding DBTDL the composition was completely cured after 3 days exposure.

This sealant was submitted to weatherability tests (outdoor; temperature range −10° C. to 5° C.) and showed no sign of dirt pick-up after 1 month.

EXAMPLE 6

Similar reaction conditions were used as in Example 5, except that PPO was replaced by PPO2, a polyoxypropylene glycol having a molecular weight of 4000 with an adjustment of the glutaryl chloride level in order to have similar Cl/OH ratio and tributylamine as stabilizer. A polymer of viscosity 80,000 cSt was prepared and a sealant composition was prepared using materials in proportions as shown below Polymer

| | |
|---|---|
| PPO2 | 100 |
| GD | 5.7 parts |
| Aminopropyltriethoxysilane | 3.37 parts |
| TIBA | 3.47 parts |
| Polymer viscosity CSt | 80000 |

Sealant

| | |
|---|---|
| Polymer | 20.5 parts |
| CaCO$_3$ | 24 parts |
| Plasticiser (polybutadiene diol) | 10 parts |
| TiO$_2$ | 4 parts |
| MTM | 0.8 part |
| DBTDL | 0.2 part |

Physical properties were tested 7 days after application and room temperature cure of the composition to form test samples.

| | |
|---|---|
| EB % | 375 |
| Modulus | 0.8 |
| Tensile MPA | 2.15 |

The composition demonstrated very good primerless adhesion on PVC, polymethylmethacrylate, anodised aluminium and glass.

EXAMPLE 7

Various compositions were made up using 20 parts of the polymer produced in Example 6, 10 parts of plasticiser, 24 parts of calcium carbonate filler 0.7 part silica, 4 parts titanium dioxide, 0.8 parts methyltrimethoxysilane, 2 parts of Irganox stabilizer, 0.1 part laurylamine and 0.2 part tin dioctoate. The plasticisers used were different for each composition. Cure characteristics of the compositions were determined in terms of SOT and tackiness. Paintability of the cured compositions was also examined; results are shown in Table 4. Two paint compositions were employed namely a latex based composition supplied under the trade marked Levistex and an alkyd based composition comprising supplied under the trade name Levis Satin. It was found that the paints spread well on the surface of the sample in all cases. Adhesion of the paint to the samples was assessed as aforesaid. Adhesion of the paint to wood was determined by similar means for comparative purposes. Results are shown in Table 4.

TABLE 4

| | Sealant Composition | | | | |
|---|---|---|---|---|---|
| Plasticiser | 1 | 2 | 3 | 4 | 5 |
| Dioctyl phthalate | Y | N | N | N | N |
| Sunflower oil | N | Y | N | N | N |
| Modified vegetable oil with polyurethane resin | N | N | Y | N | N |
| Polyadipate | N | N | N | Y | N |
| Epoxy soya oil | N | N | N | N | Y |
| Physical Properties | | | | | |
| SOT (hours) | 5 | 4 | 4 | 3.5 | * |
| Tackiness | 1 | ** | 3 | 2 | 0 |
| Paintability | | | | | |
| Latex Paint | | | | | |
| to Sealant | 0 | 0 | 5 | 90 | |
| to Wood | 0 | 0 | 5 | 60 | |
| Alkyd Paint | | | | | |
| to Sealant | U | U | 100 | 100 | |
| to Wood | U | U | 100 | 100 | |

* sealant uncured after 5 days exposure
** surface bleeding

EXAMPLE 8

123.4 parts adipoyle chloride were added and allowed to react with 4000 parts polypropylene glycol PPO2 during 2 hours at 120° C. under reduced nitrogen pressure (10 mbar) to give a product of 16,300 cSt viscosity (MW=12,500). Another 123.4 parts of adipoyle chloride were added and allowed to react with the mixture under the same conditions but during 1 hour only to give an acid chloride polymer of 160,000 cSt viscosity and 12500 molecular weight (Mw). Hydrogen chloride resulting from the reaction was trapped in a 0.984N KOH solution. A quantity of 40 parts of the acid chloride polymer so prepared was then mixed in a dental mixer with aminopropyltrimethoxysilane (AMMO), methyltrimethoxy-silane (MTM) and dibutyltidilaurate (DBTDA) in the proportions illustrated in the following Table. Cure characteristics of the compositions were determined in terms of SOT, TFT, surface tackiness. Mechanical resistance as tensile, elongation at break and modulus are also reported in the Table.

| | SAMPLES | | | |
|---|---|---|---|---|
| | 1 | 2 | 3 | 4 |
| Ammo | 3 | 3 | 1.6 | 1.6 |
| MTM | 1.6 | 0.8 | 1.6 | 0.8 |
| DBTDA | 1.2 | 0.6 | 0.6 | 1.2 |
| SOT | 19' | 2' | 1h07' | 33' |
| TFT | 1h02' | 3' | 5h01' | 2h18' |
| Tackiness | 4 | 3 | 2 | 1 |
| Tensile | | 1.22 | 0.53 | |
| Elongation | | 423.5 | 408.0 | 355.0 |
| Modulus | | 0.20 | 0.15 | 0.15 |

| | SAMPLES | | |
|---|---|---|---|
| | 5 | 6 | 7 |
| Ammo | 3 | 3 | 3 |
| MTM | 1.6 | 1.6 | 1.6 |
| DBTDA | 1.2 | 1.2 | 1.2 |
| SOT | 8' | 5' | 15' |
| TFT | 18' | 12' | 25' |

| | | | |
|---|---|---|---|
| Tackiness | 4 | 4 | 4 |
| Tensile | 0.99 | 0.96 | 1.22 |
| Elongation | 333 | 333.5 | 370 |
| Modulus | 0.25 | 0.25 | 0.23 |

EXAMPLE 9

The procedure of Example 8 was followed to produce (a) a hydroxyl end-capped polymer having a viscosity of 15,200 cSt and (b) a chloride end-capped polymer having a viscosity of 270,000 cSt (Mw=18,500) at the end of both steps of adipoyl chloride addition. A quantity of 1000 parts of the chloride polymer was introduced to a 5 liter Spangenberg mixer and mixed under vacuum with 40 parts aminopropyltrimethoxysilane, 40 parts methyltrimethoxysilane, 500 parts dibutylphthalate (DPB) during respectively 30 minutes and twice 2 minutes. Treated precipitated calcium carbonate was introduced in 2 steps of 600 parts each. The UV stabiliser $TiO_2$ was added with the second additioin of carbonate and mixed for 10 minutes. The antioxidant Irganox 1520 and the catalyst tin octoate were added and homogenised in the composition for 20 minutes. Lauryl amine (15.2 g) and octanoic acid (15.2 g) were introduced at the end and mixed for 5 minutes. Cure characteristics of the sealant tested were in terms of SOT and TFT. They are respectively of 85 and 95 minutes.

That which is claimed is:

1. A moisture curable composition comprising the reaction product of (A) a condensation product of a polyacid chloride with an organic polymer having chain units selected from the group consisting of alkylene and oxyalkylene units in its molecular chain and substituent condensible groups with (B) an organosilicon compound of the general formula

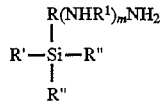

wherein each R may be the same or different and represents a linking group represented by —$(CH_2)_n$— where n has a value of from 2 to 10; each R" may be the same or different and represents a hydrolysable group; R' represents a group —$R(NHR^1)_mNH_2$, a group R", or a group $R^1$ where $R^1$ represents a monovalent hydrocarbon group; and m has a value of from 0 to 10.

2. A composition according to claim 1 wherein the organic polymer is a linear alpha, omega-dihydroxy polyoxyalkylene glycol having chain units of the formula

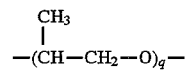

with or without chain units of the formula —$(CH_2—CH_2—O)_p$— where p has a value of from 0 to 100, and q has a value of from 1 to 300.

3. A composition according to claim 1 wherein the group $R(NHR^1)_mNH_2$ is aminopropyl and m is 0.

4. A composition according to claim 1 wherein the group R' represents R".

5. A composition according to claim 1 wherein the or each R" represents alkoxy, oximo, alkenyloxy or alkyoxyalkoxy.

6. A composition according to claim 1 wherein the organosilicon compound is selected from the group consisting of γ-aminopropyltrimethoxysilane and γ-aminopropyltriethoxysilane.

7. A composition according to claim 1 wherein the acid chloride comprises an α,ω-diacid chloride of a saturated aliphatic dicarboxylic acid of the formula

in which R represents —$(CH_2)_n$— where n has a value from 2 to 10.

8. A composition according to claim 2 wherein the polyoxyalkylene glycol and polyacid chloride are reacted under conditions such that the polymer produced contains both chain extending and chain terminating units derived from the acid chloride.

9. A composition according to claim 1 also comprising a silane (C) different from the organosilicon compound (B) and which silane has two, three or four hydrolysable groups selected from the group consisting of acetoxy, oximo, alkoxy and alkenyloxy groups.

10. A composition according to claim 9 wherein the silane is methyltrimethoxysilane.

11. A composition according to claim 1 also comprising a condensation catalyst selected from the group consisting of organotin salts and titanium complexes.

* * * * *